(12) United States Patent
Sieper et al.

(10) Patent No.: US 11,679,538 B2
(45) Date of Patent: Jun. 20, 2023

(54) METHOD FOR PRODUCING PLASTIC PLUG-IN CONNECTOR

(71) Applicant: VOSS AUTOMOTIVE GMBH, Wipperfürth (DE)

(72) Inventors: Günter Sieper, Remscheid (DE); Markus Berger, Wipperfürth (DE); Harald Hagen, Wipperfürth (DE); Fabian Seinsche, Wiehl (DE)

(73) Assignee: VOSS Automotive GmbH, Wipperfürth (DE)

( * ) Notice: Subject to any disclaimer, the term of this patent is extended or adjusted under 35 U.S.C. 154(b) by 770 days.

(21) Appl. No.: 16/604,834

(22) PCT Filed: Apr. 10, 2018

(86) PCT No.: PCT/EP2018/059142
§ 371 (c)(1),
(2) Date: Oct. 11, 2019

(87) PCT Pub. No.: WO2018/189167
PCT Pub. Date: Oct. 18, 2018

(65) Prior Publication Data
US 2020/0164553 A1 May 28, 2020

(30) Foreign Application Priority Data

Apr. 11, 2017 (DE) ...................... 10 2017 107 756.1

(51) Int. Cl.
*B29C 45/00* (2006.01)
*B29C 45/26* (2006.01)
(Continued)

(52) U.S. Cl.
CPC ...... *B29C 45/0046* (2013.01); *B29C 45/0025* (2013.01); *B29C 45/261* (2013.01);
(Continued)

(58) Field of Classification Search
CPC .............. B29C 45/0046; B29C 45/261; B29C 45/2612; B29C 2045/2716
See application file for complete search history.

(56) References Cited

U.S. PATENT DOCUMENTS 3,474,999 A * 10/1969 Shupe ................... B29C 33/485
425/441
3,941,169 A * 3/1976 Bassani ................. B29C 45/231
141/82
(Continued)

FOREIGN PATENT DOCUMENTS

DE 202005017314 U1 12/2005
DE 102005052825 A1 5/2007
(Continued)

OTHER PUBLICATIONS

Machine translation of NL 1032894 C2, May 20, 2008 (Year: 2008).*

*Primary Examiner* — Benjamin A Schiffman
(74) *Attorney, Agent, or Firm* — Honigman LLP; Eric J. Sosenko; Jonathan P. O'Brien

(57) ABSTRACT

A plug-in connector produced by injection molding a plastic material and having an internal channel for a fluid and having three main sections situated axially one behind the other. The plug-in connector has a gate point on its outer circumference solely on one side and a mass distribution of the plastic material that is radially asymmetrical with respect to the circumference and which is present in at least one of the main sections of the shaped part. A method for the production of the plug-in connector is likewise disclosed.

11 Claims, 5 Drawing Sheets

(51) Int. Cl.
  *B29C 45/27* (2006.01)
  *F16L 37/088* (2006.01)
  *B29K 77/00* (2006.01)
  *B29K 105/12* (2006.01)
  *B29K 309/08* (2006.01)
  *B29L 31/24* (2006.01)
  *B29L 31/36* (2006.01)

(52) U.S. Cl.
  CPC ...... *B29C 45/2612* (2013.01); *B29C 45/2708* (2013.01); *B29C 2045/0027* (2013.01); *B29C 2045/2716* (2013.01); *B29K 2077/00* (2013.01); *B29K 2105/12* (2013.01); *B29K 2309/08* (2013.01); *B29L 2031/24* (2013.01); *B29L 2031/36* (2013.01); *F16L 37/088* (2013.01)

(56) References Cited

U.S. PATENT DOCUMENTS

| | | | | |
|---|---|---|---|---|
| 3,992,503 A * | 11/1976 | Henfrey | ............... | B29C 45/0003 |
| | | | | 264/DIG. 83 |
| 4,010,903 A * | 3/1977 | Sakuri | ................ | B29C 45/2806 |
| | | | | 239/533.1 |
| 4,126,291 A * | 11/1978 | Gilbert | .................... | B29C 45/34 |
| | | | | 249/141 |
| 4,303,221 A * | 12/1981 | Gallusser | .............. | B29C 33/485 |
| | | | | 249/102 |
| 5,038,455 A * | 8/1991 | Guest | ...................... | B29C 57/00 |
| | | | | 264/296 |
| 5,759,647 A | 6/1998 | Kuroda et al. | | |
| 6,277,308 B1 * | 8/2001 | Kiernicki | .............. | B29C 45/261 |
| | | | | 425/468 |
| 6,349,977 B1 * | 2/2002 | Ketcham | ............... | B29C 45/261 |
| | | | | 285/319 |
| 6,424,469 B2 * | 7/2002 | Hirai | ................... | B29C 45/4421 |
| | | | | 359/699 |
| 6,503,430 B1 * | 1/2003 | Downey | ............... | B29C 45/261 |
| | | | | 264/161 |
| 9,084,867 B2 * | 7/2015 | Triel | ...................... | B29C 45/261 |
| 2006/0249216 A1 * | 11/2006 | Sexton | ............... | B29C 45/1642 |
| | | | | 138/141 |
| 2007/0003662 A1 | 1/2007 | Chiba | | |
| 2011/0150602 A1 | 6/2011 | Sieper | | |
| 2012/0306118 A1 * | 12/2012 | Hayashi | ............... | B29C 45/2628 |
| | | | | 264/249 |
| 2012/0306197 A1 * | 12/2012 | Liu | ..................... | B29C 45/4421 |
| | | | | 425/577 |
| 2013/0240528 A1 | 9/2013 | De Beer et al. | | |
| 2914/0000734 | 1/2014 | Niwa et al. | | |
| 2014/0180261 A1 * | 6/2014 | Nyman | ............... | A61M 25/0015 |
| | | | | 427/2.3 |
| 2014/0217727 A1 | 8/2014 | Miyajima et al. | | |
| 2018/0229158 A1 * | 8/2018 | Taki | ....................... | B01D 29/111 |
| 2019/0255282 A1 * | 8/2019 | Inukai | ............... | B29C 45/14598 |

FOREIGN PATENT DOCUMENTS

| | | |
|---|---|---|
| DE | 102008006376 A1 | 7/2009 |
| DE | 102008018514 A1 | 10/2009 |
| DE | 102013010840 A1 | 1/2014 |
| JP | H09277313 A | 10/1997 |
| NL | 1032894 C2 | 5/2008 |
| WO | 2008090424 A1 | 7/2008 |
| WO | 2010006838 A1 | 1/2010 |
| WO | 2013092234 A1 | 6/2013 |
| WO | 2015158805 A1 | 10/2015 |

\* cited by examiner

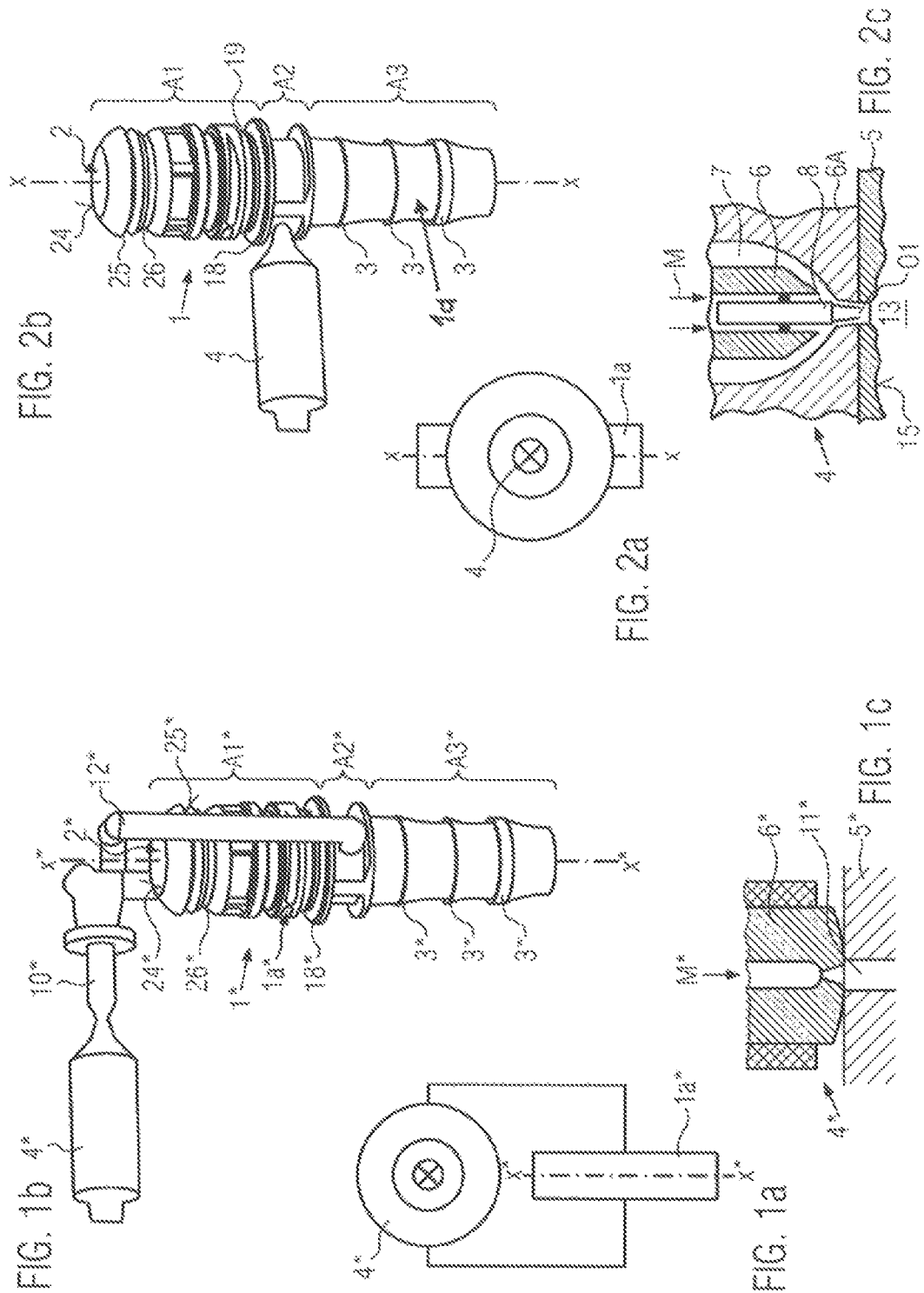

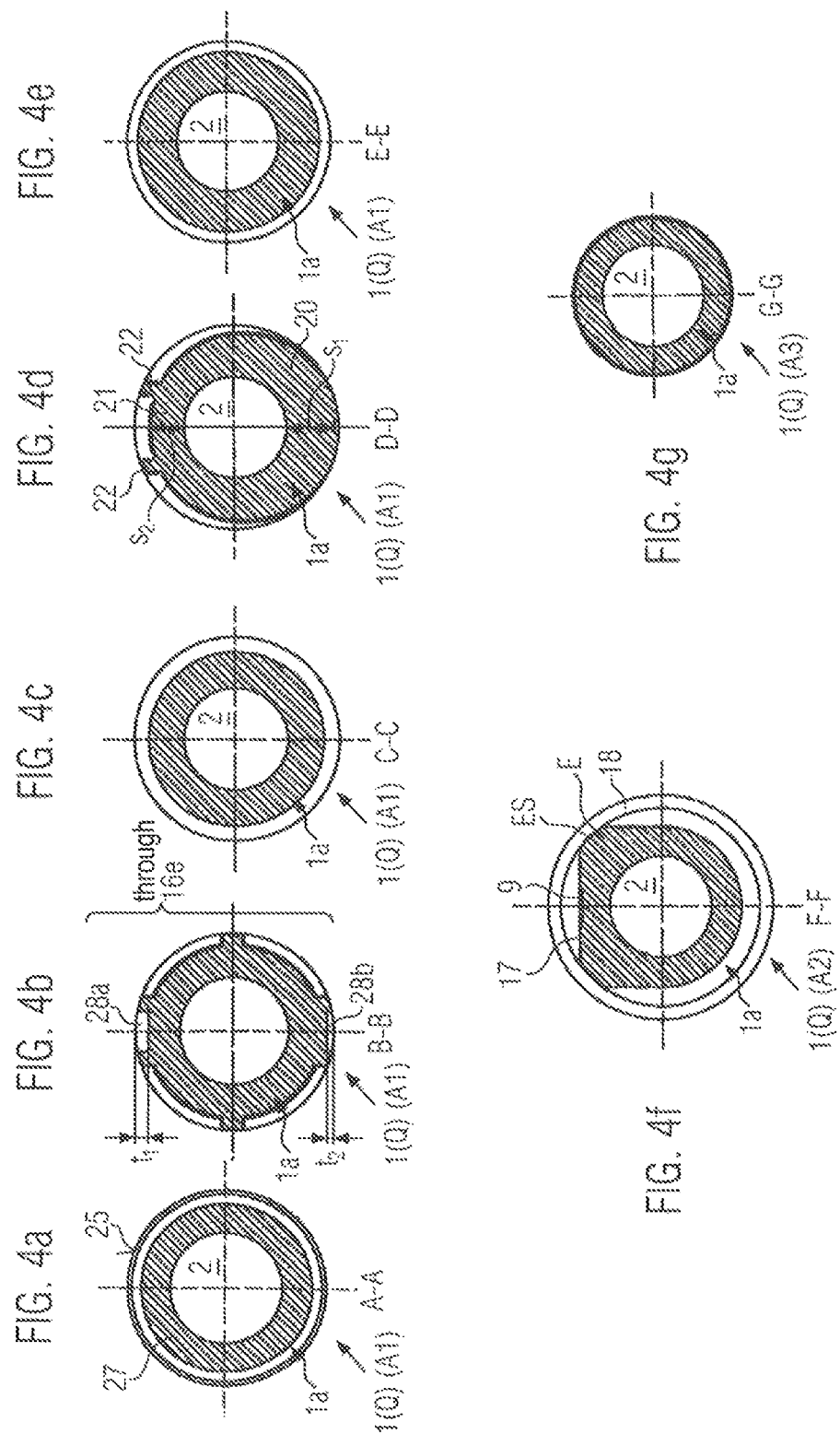

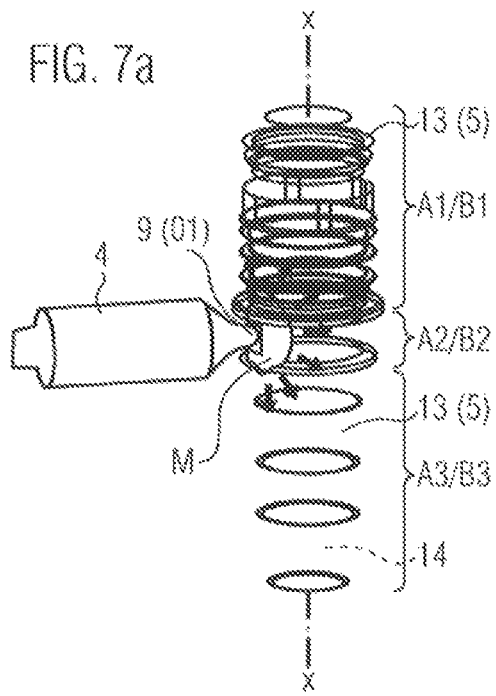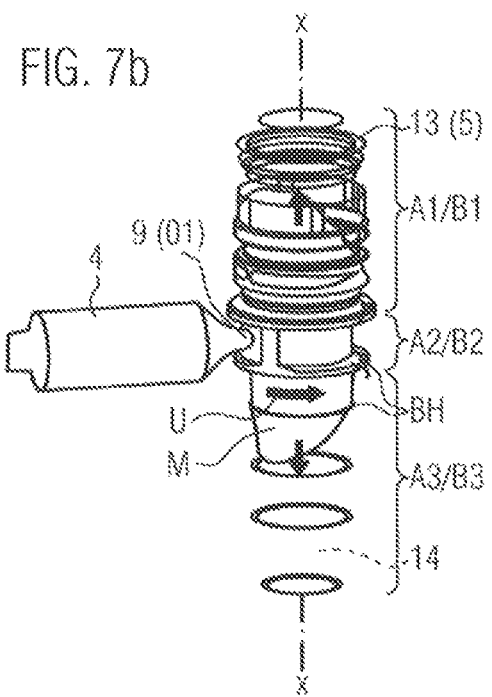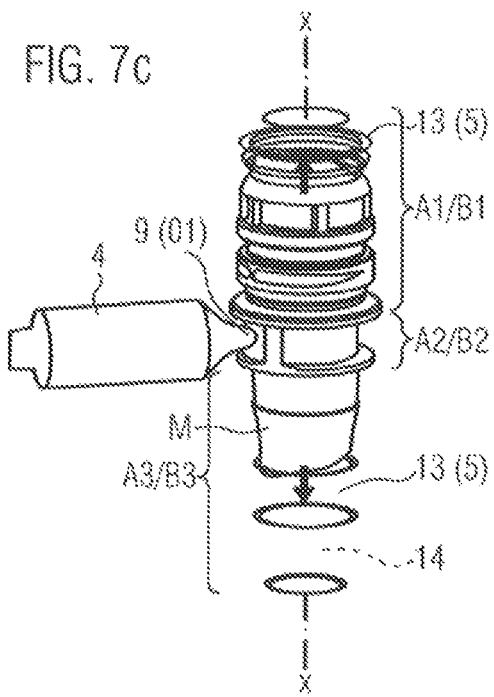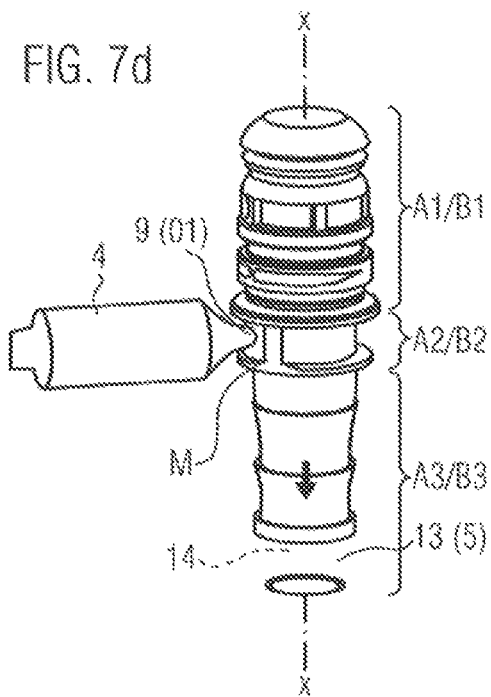

METHOD FOR PRODUCING PLASTIC PLUG-IN CONNECTOR

1. FIELD OF THE INVENTION

The invention relates to a plug-in connector, which is formed as an injection-molded part composed of plastic, has an at least partially annular cross section, and has an inner channel for a fluid and three main portions situated axially one behind the other, specifically a central portion and two connecting portions adjoining the central portion at both sides.

The invention also relates to a method for producing a plug-in connector of said type, wherein the plug-in connector is produced as a molded part by injection molding from a plasticized plastic, which is injected as a polymer compound under pressure radially inward into a cavity formed by an inner wall of a molding tool, wherein, in the cavity, to form an inner channel of the plug-in connector, there is arranged a core around which the polymer compound flows in a circumferential and in an axial direction until the cavity has been completely filled, following which the polymer compound cools, possibly with application of a holding pressure, until it solidifies, and wherein the molded part is subsequently demolded from the molding tool.

2. BACKGROUND

A plastics plug-in connector of said type can be used as a plug part in a plug-in coupling for pressure medium lines, which plug-in coupling comprises two coupling parts, specifically a housing part and a plug part, wherein the plug part can be inserted with a plug shank or plug-in portion in a circumferentially sealed manner into a receiving opening of the housing part and can be arrested, so as to be prevented from being released, by means of a locking device. Such a plug-in coupling may be used in particular in motor vehicle brake systems, primarily in heavy goods vehicle compressed-air brake installations, and is described by way of example in WO 2010/006838 A1. The specific feature of said known, proven plug-in coupling consists in that, in it, a double detent element for the coupling parts is provided, which double detent element, in the assembled position, is held in a detent recess, formed by a special circumferential groove, of the plug part. For the plug-in connector according to the invention, said special form of the circumferential groove is however not an essential feature, and said plug-in connector may also be used in other plug-in systems, for example in plug-in systems as described in WO 2010/006838 A1 as prior art.

In the context of the application, the expression "plug-in connector" is used synonymously for the expressions "plug" and "plug-in connector part" ("male part"), whereas the counterpart to this is the "housing part", which can also be referred to as "plug-in socket" or "socket part" ("female part"). "Connectors" or "coupling parts" are used as generic terms, wherein the coupling parts—plug-in connector and housing part—together form the plug-in coupling by virtue of the plug being inserted into the socket.

Here, in particular in the case of quick-action connectors, it is necessary for a certain axial straightness to be adhered to for the plug-in connector; that is to say, in order to ensure problem-free assembly, the plug-in connector must not be axially curved. The method for producing the plastics plug-in connector must be configured correspondingly. Here, it is necessary that no excessive distortion of the plug-in connector formed as an injection-molded part occurs. Such distortion, which can however never be entirely avoided, must thus be minimized during injection molding.

The straightness of the plug-in connector is particularly important because it can have an effect in particular on the plug-in forces that must be imparted during the production of the plug-in coupling, on the automatic assemblability, and on the sealing action, and further characteristics, that are obtained after the assembly process. In the presence of excessive axial curvature, it could for example be the case that sealing rings that are preferably installed on the plug part are compressed only on one side, which could give rise to leakage in the operational state.

During plastics injection molding, a plasticized polymer compound, possibly comprising fillers, is injected through an injection opening of a molding tool into at least one cavity of the molding tool, thus forming a molded part. After a solidification of the polymer compound, the molded part is demolded from the tool. The abovementioned plastics plug-in connector is a molded part producible in accordance with a method of said type. Here, "composed of plastic" also encompasses that the plastic may comprise further constituents, such as filler materials.

Injection molding is a known, discontinuous primary forming process used for example for plastics. Injection molding makes it possible to industrially produce immediately usable molded parts in large unit quantities and with high precision. For this purpose, in an injection unit of an injection molding machine, the respective material is plasticized to form a flowable molding compound and is injected through a nozzle into the injection molding tool. Modern injection molding machines operate with a screw which simultaneously plasticizes, conveys and injects via feed channels into the tool. In the cavity or mold cavity of the tool, the polymer compound solidifies. Volume shrinkage that occurs during the solidification may basically—but only to a certain extent—be compensated by means of a holding pressure applied prior to the removal. This deficiency may constitute a negative factor for the desired straightness in the case of a plastics plug-in connector. When the molding is demolded from the tool, it generally has a part referred to as sprue, which does not belong to the molded part to be produced, and which must be retroactively removed. Said sprue forms owing to the compound that has solidified in the feed channels to the casting mold, and should have the lowest possible weight in order to prevent waste.

The injection that is performed after the plasticizing of the plastic, the application of holding pressure and the demolding determine a so-called cycle time of the production of the molded part, which should be kept short in the context of high productivity in the manufacturing process.

Thermoplastic, thermosetting and elastomer materials can be processed by means of injection molding. It is also known, during the injection molding of thermoplastic materials, to use compounds comprising in particular glass fibers as fillers, whereby it is possible to produce relatively high-strength molded parts. The compound temperature amounts to approximately 100° C. to 350° C. during the injection molding, the injection pressure amounts to approximately 400 bar to 1600 bar, and the tool temperature amounts to approximately 40° C. to 160° C. During the processing of thermoplastics, the screw is relatively warm, in order to melt the thermoplastic material. By contrast, the tool is relatively cold in order to cool the molded part presently being formed. During the processing of thermosetting materials, the temperature of the plasticizing unit must be adapted to the flow hardening characteristics, and is therefore generally lower than in the case of thermoplastic materials, whereas the tool must be kept hotter than the injection unit in order that the compound can solidify there. A similar situation applies in the case of the processing of elastomer materials.

By contrast to calendering, by means of which generally only planar layers of uniform thickness are generated, it is the case in injection molding that the hollow space of the tool, the so-called cavity, determines the shape and the surface structure of the finished part. The negative contour of the molded part, that is to say of the plastics plug-in connector of the type mentioned in the introduction, is formed in the inner wall of the molding tool. By means of inserted cores, preferably by means of a cylindrical core, it is possible for cavities to be formed in the molded part, such as for example the inner channel of the plug-in connector.

The plastics plug-in connector can be produced in one working step by the injection molding. For this purpose, the injection of the plasticized polymer compound into the cavity is performed in a known manner, using so-called open nozzles, through at least two injection openings situated circumferentially diametrically opposite one another, wherein the compound flows around an inner core of the tool, forming a ring, and converges in each case in the center between the injection openings. At these locations, binding seams form, which generally exhibit a lower strength than the rest of the body of the molded part.

SUMMARY

The invention is based on the object of creating a plastics plug-in connector of the type mentioned in the introduction, and a method of the type mentioned in the introduction, whereby improved production of the plug-in connector with regard to material economy and productivity is made possible whilst adhering to a demanded axial straightness of the plug-in connector.

For the plug-in connector, said object is achieved according to the invention in that the molded part has a gate point exclusively at one side on its outer circumference, wherein a circumferentially radially asymmetrical mass distribution of the plastic is present in at least one of the main portions of the molded part.

Here, in detail, provision may be made whereby at least one of the connecting portions is a plug-in portion, wherein, in particular, the other connecting portion is likewise formed as a plug-in portion or is formed as an attachment portion with a barbed part or as a screw part with an internal or external thread.

Likewise, in detail, it is also possible that at least one of the connecting portions is an attachment portion, wherein, in particular, the other connecting portion is likewise formed as an attachment portion with a barbed part or as a screw part with an internal or external thread or as a plug-in portion.

For the method, said object is achieved according to the invention in that the polymer compound is injected exclusively at one side through a single injection opening, wherein, in at least one of the regions of the axial length of the molding tool, a filling control element is arranged on the inner wall, which filling control element, during the filling of the cavity, inhibits the flow of the polymer compound in an axial direction and/or generates a radially asymmetrical distribution of the polymer compound circumferentially around the core.

In this way—in the case of injection at only one side—it is advantageously achieved, by means of the mass distribution and geometry of the injection-molded part as produced according to the invention, that the filling, and in particular the distortion that subsequently follows during the cooling, can be influenced such that a component is created which, at least in partial regions, in particular in the main functional regions, of the plug part according to the invention, is optimally straight for a fluidic plug-in connection.

Here, it is preferably possible for the polymer compound to be injected into a central region of the cavity of the molding tool, such that the molded part has the gate point of the plastic in the central portion. The formation of the radially asymmetrical mass distribution, as a result of which compound accumulations arise, may also preferably take place in this region. The central region of the cavity of the molding tool is to be understood here to mean that region of the cavity which is intended for the formation of the central portion, situated between the two connecting portions, of the plug-in connector.

The polymer compound basically initially begins to fill the cavity by flowing out of the injection opening simultaneously to both sides at equal speed in an axial direction of the molded part and to both sides at equal speed in a circumferential direction around the core. Such filling of the cavity is referred to as a frontal flow. Here, the compound flow is laminar even in the case of high injection speeds. An accumulation of the compound typically occurs at the tool wall, which can however be reduced if required by means of an anti-adhesion coating. This results in the frontal flow. Here, in a flow of the propagating compound, the speed is at its greatest in the center of the cross section. Here, hot compound is always replenished.

By means of the filling control element, which, with regard to its function whereby it inhibits the flow of the polymer compound in an axial direction during the filling of the cavity, and which could also be referred to as flow retarder, or else by means of two or more such elements, it can advantageously be achieved that the polymer compound propagates with a higher speed in a circumferential direction than in an axial direction during the filling of the cavity.

The filling control elements may in this case be formed by projections or recesses, which run in encircling fashion in the cavity, or which are only unilateral, symmetrical or asymmetrical, in the inner wall of the tool. Since, during the filling of the cavity, the compound is a viscous compound which flows freely under pressure, a cross section constricted by the filling control elements does not cause any increase of the flow speed, but rather causes channeling, that is to say a diversion, of the mass flow. The filling control elements could thus also be referred to as flow diverting elements. The frontal flow in an axial direction is in this case retarded. A rectangular cross-sectional form arranged in particular immediately adjacent to the gate point and enlarging the annular cross section also has an effect. There, the compound initially fills the corners before flowing onward in an axial direction. In this way, it is advantageously possible to achieve fast closure of a ring of the melt compound in the cross section of the molded part, and to influence optimum formation of the binding seams that form, for example as a result of displacement and/or shortening thereof.

Here, it has surprisingly been found that the measures used according to the invention, such as the use of one or more compound accumulations, which, according to the prevailing opinion of experts—for the specific reason that compound accumulations lead to increased distortion—should basically be avoided in injection molding technology, may even have a positive effect on the straightness of the part. They can—so to speak as a "counterweight" for mass shrinkage spontaneously occurring during the cooling at another location, for example on the diametrically oppositely situated side of the cross section of the molded part—even out the overall shrinkage and thus compensate distortion occurring on one side.

In a particularly preferred embodiment of the method according to the invention, a needle closure nozzle may be used for the injection of the polymer compound. This is a hot channel nozzle by means of which injection can be performed directly on the plastics connector. The plug-in connector according to the invention can thus advantageously be produced entirely without sprues. In the case of the needle closure nozzle, after the injection of the plastics compound, the gate diameter is closed by a steel needle, and the residual injected material is forced into the plastics part. The needle can be aligned exactly flush with the surface of the plastics part. On the part, one thereafter sees only a small but still-visible round marking. This may optionally also be formed so as to be elevated or slightly recessed in relation to the surface. In the case of open hot channel nozzles, a small amount of residual injected material instead always remains at the breakaway point after the injection—even if no feed channels are present. In any case, a gate point can also be identified by the fact that fibers in the solidified polymer compound—if present—are present in a less ordered manner in the region of the gate points than in other regions.

Although manufacturing from a thermosetting plastic is basically also possible, albeit with the modifications to the process as mentioned in the introduction, the connector according to the invention is however, in a particularly preferred embodiment, produced from a thermoplastic material, such as polyamide, in particular from the material PA 6, PA11, PA12 or PA 66. The polymer compound is then in any case a melt. A filler content, in particular a fiber content, may in this case lie in the range from 0 to 60 percent, preferably in the range from 20 to 40 percent, in relation to the total mass. The fibers may—in particular in an embodiment as glass fibers—have a length in the range from 0.1 mm to 10 mm, preferably in the range from 0.2 mm to 0.5 mm, and a mean diameter in the range from approximately 3 μm to 35 μm, preferably in the range from 5 μm to 20 μm. The viscosity of plasticized thermoplastic materials differs. By contrast to viscid plastics with a low melting point, such as polyethylene, in the case of injection molding compounds with a very high melting temperature, such as for example in the case of the stated polyamides, the melt is inviscid and escapes as soon as the injection cylinder is lifted off from the injection mold within the injection cycle.

For such low-viscosity plastics melts, the use of a needle closure nozzle is particularly suitable because it allows the plastics melt to pass through only during the injection process, which takes place at high injection pressure, whereas, when the injection cylinder has been lifted off, the escape of the melt from the nozzle is prevented. The outlet opening, generally a bore in the nozzle tip, is sealed off in the interior of the nozzle by a closure needle which, in a cylindrical, pressure-tight guide, is subjected to spring pressure. In the case of a different construction, the pressure is exerted hydraulically or pneumatically on the closure needle via levers outside the nozzle. Needle closure nozzles ensure a clean, continuous injection molding process. By means of the targeted closure, the plastics compound is prevented from dripping out. Likewise, disruptive stringing, which has an adverse effect on quality, is also prevented. Altogether, it is possible to ensure production which is reliable and disruption-free and which—owing to relatively short cycle times in relation to open nozzles—is highly efficient.

Further advantageous embodiments of the invention will emerge from the following description of figures, and from the dependent claims.

BRIEF DESCRIPTION OF THE DRAWINGS

In the figures, a known method and construction and the inventive method and instruction are shown as follows:

FIG. 1a is a schematic illustration showing a known method for producing a known plug-in connector.

FIG. 1b is a perspective illustration showing a known method for producing a known plug-in connector.

FIG. 1c shows a section through a nozzle used during the known method for producing the known plug-in connector.

FIG. 2a is, analogously to FIG. 1a, a schematic illustration showing a method according to the principles of the present invention for producing a plug-in connector.

FIG. 2b is, analogously to FIG. 1b, a perspective illustration for showing the method according to the principles of the present invention for producing a plug-in connector.

FIG. 2c shows, analogously to FIG. 1c, a section through a nozzle used during the method according to the principles of the present invention for producing a plug-in connector.

FIG. 3b shows a plan view of the preferred embodiment of a plug-in connector illustrated in FIG. 3a, but rotated through 180° about its longitudinal axis, and shown on a smaller scale, in relation to the illustration in FIG. 3a.

FIG. 4a shows a cross section through the preferred embodiment of a plug-in connector illustrated in FIG. 3a, in the section plane A-A in FIG. 3a.

FIG. 4b shows a cross section through the preferred embodiment of a plug-in connector illustrated in FIG. 3a, in the section plane B-B in FIG. 3a.

FIG. 4c shows a cross section through the preferred embodiment of a plug-in connector illustrated in FIG. 3a, in the section plane C-C in FIG. 3a.

FIG. 4d shows a cross section through the preferred embodiment of a plug-in connector illustrated in FIG. 3a, in the section plane D-D in FIG. 3a.

FIG. 4e shows a cross section through the preferred embodiment of a plug-in connector illustrated in FIG. 3a, in the section plane E-E in FIG. 3a.

FIG. 4f shows a cross section through the preferred embodiment of a plug-in connector illustrated in FIG. 3a, in the section plane F-F in FIG. 3a.

FIG. 4g shows a cross section through the preferred embodiment of a plug-in connector illustrated in FIG. 3a, in the section plane G-G in FIG. 3a.

FIG. 7a is a schematic illustration showing a first phase during the filling of the cavity of a molding tool according to the principles of the present invention for producing a plug-in connector.

FIG. 7b is a schematic illustration for showing a second phase during the filling of the cavity of a molding tool for producing a plug-in connector according to the principles of the present invention.

FIG. 7c is a schematic illustration showing a third phase during the filling of the cavity of a molding tool for producing a plug-in connector according to the principles of the present invention.

FIG. 7d is a schematic illustration showing a fourth phase during the filling of the cavity of a molding tool for producing a plug-in connector according to the principles of the present invention.

In the various figures of the drawing, identical parts are always denoted by the same reference designations, and are therefore generally described only once.

DETAILED DESCRIPTION

Figure 3A:
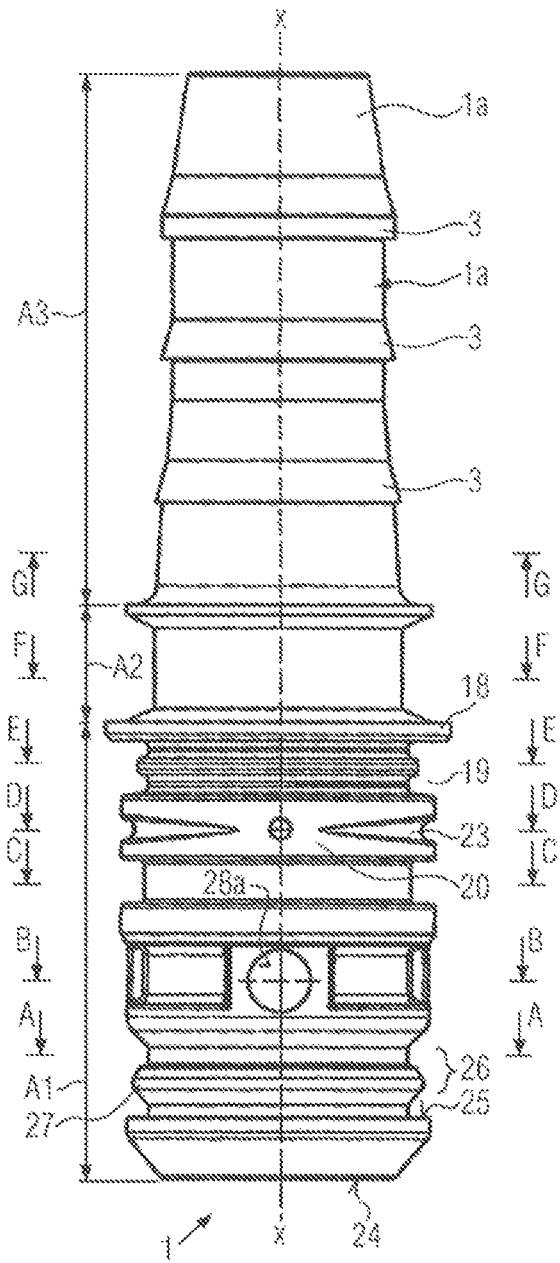
FIG. 3a shows a plan view of a preferred embodiment of a plug-in connector according to the principles of the present invention.

With regard to the following description, it is claimed here that the invention is not restricted to the exemplary embodiment, and here is not restricted to all or several features of described combinations of features; rather, each individual sub-feature of the exemplary embodiment is of significance for the subject matter of the invention also separately from all other sub-features described in conjunction therewith, and also in combination with other features.

As shown in FIGS. 2a to 2c, the present invention relates to a plug-in connector 1, which is formed as a molded part 1a composed of plastic and produced by injection molding and which has an inner channel 2 for a fluid and has an at least partially annular cross section Q. Various sections through the cross section are illustrated in FIGS. 4a to 4g, as expressed by the reference designation "Q" placed between parentheses after the reference designation "1" for the plug-in connector.

The plug-in connector 1 (FIGS. 2a to 2c) has—like a plug-in connector 1* according to the prior art (FIGS. 1a to 1c)—three main portions A1, A2, A3 situated axially one behind the other, specifically a central portion A2 and two connecting portions A1, A3 adjoining the central portion A2 on both sides, of which one connecting portion A1 is a plug-in portion A1 and the other connecting portion A2 is an attachment portion A2. Since the corresponding main portions A1, A2, A3 are each simultaneously referred to as central portion A2, connecting portions A1, A3 and plug-in portion A1 and attachment portion A3, in each case also only one reference designation is used for them in order to illustrate this identity. Although the central portion A2 is not without function, by virtue of the fact that it holds the two connecting portions A1, A3 together, only the connecting portions A1, A3 will, with regard to their main function of the connection, also be referred to below as functional portions. In the sectional images—FIGS. 4a to 4g—it is indicated by means of further reference designations "A1", "A2", "A3" placed between parentheses after the reference designation "1" which of the portions the respective section lies in.

The plug-in portion A1 is, as connecting portion A1, designed to form a plug-in connection with a socket part (not illustrated). The attachment portion A3 is, as connecting portion A3, designed to form a connection to a line (not illustrated). The attachment portion A3 is, in the embodiment illustrated, formed as a barbed part and therefore has encircling holding edges 3 for the barb-mounting of a hose line.

The attachment portion A3 could however also be of some other suitable design, for example exactly hollow cylindrical and composed of a material which is suitable for laser welding to a, preferably rigid, plastics line.

In particular for the functional portions A1, A3, it is important for these to be straight, wherein, however, in the case of an attachment portion A3 formed as a barbed part, greater deviations from straightness can be permitted than in the case of a laser-weldable attachment portion A3.

From a comparison of FIGS. 1a to 1c, which illustrate the known method for producing a known plug-in connector 1*, with FIGS. 2a to 2c, which demonstrate by way of example a method for producing a plug-in connector 1 according to the principle of the present invention, the differences described below become apparent. In order to distinguish the known plug-in connector 1* and the known method from the plug-in connector 1 and the method according to the present invention, all of the reference designations in FIGS. 1a to 1c are additionally provided with an asterisk (*). Those parts in the known plug-in connector 1* that correspond to the parts of the plug-in connector 1 according to the present invention will therefore not all be described in detail below.

The known plastics plug-in connector 1* is produced by injection molding, wherein the injection of a plasticized polymer compound M* into the cavity of a (tool not illustrated) in FIGS. 1a and 1b is performed using an open nozzle 4*. Such a nozzle 4* is illustrated by way of example in more detail in FIG. 1c. Here, the reference designation 5* denotes the tool, and the reference designation 6* denotes the nozzle body.

According to the invention, instead, the injection of the plasticized polymer compound M into the cavity is performed preferably using a needle closure nozzle 4, which—as in the case of the open nozzle 4*—is a so-called hot channel nozzle designed for the processing of thermoplastics. Such a nozzle 4 is illustrated in more detail by way of example in FIG. 2c. Here, the reference designation 6 denotes a nozzle core, the reference designation 7 denotes an insulating layer, and the reference designation 8 denotes a closure needle. All of these parts are situated in the nozzle body 6A. The tool is denoted by the reference designation 5.

During the injection process, which is performed under the injection pressure, the needle closure nozzle 4 allows the polymer compound M to pass through, wherein the escape of the compound M from the nozzle 4 when the nozzle body 6A of the latter lifts off is then however prevented because the closure needle 8 moves into the injection opening O1 and seals off the latter.

Furthermore, after the injection of the plastics compound M, which flows in a viscous manner, the inner diameter of the nozzle 4 is closed by the needle 8, and residual injected material is subsequently forced into the molded part 1a. This has the effect that, after the injection molding process, only a round marking that makes the gate point 9 visible can be seen on the molded part 1a, as emerges from FIG. 3b and FIG. 4f.

As is known, according to the prior art, the injection is performed through at least two injection openings which are situated circumferentially diametrically opposite one another, wherein the compound M*, after passing through the nozzle 4*, is conducted through a sub-distributor 10*, where a distribution into two partial streams occurs. Said compound flows through channels which are formed in the tool 5* and which are denoted in FIG. 1c by the reference designation "11*", and then passes into an annular space formed around an inner core, where it converges in each case in the center between the injection openings and forms the molded part 1a*, which has binding seams at the locations of the convergence of the compound M*. Owing to this symmetrical form, the shrinkage of the molded part 1a* during the subsequent cooling advantageously leads to a straight plug-in connector 1*. A disadvantage is however the sprue 12* that forms in the channels 11* of the tool 5*, which may even make up one third of the total mass of the injection molding and which must subsequently be cut off from the molded part 1a* and disposed of as waste if direct recycling is not possible. A further disadvantage is the formation of two binding seams, because each binding seam reduces the strength.

According to the invention, the injection is performed exclusively through a single injection opening O1, wherein the compound M, after passing through the nozzle 4, passes directly into the cavity 13, that is to say into the annular space formed around the inner core 14 (see FIG. 6) by the inner wall 15 of the cavity, where said compound converges diametrically opposite the injection opening O1 and, in each case, forms the molded part 1a, which advantageously has only a single binding seam at the location of the convergence. Also advantageous is the avoidance of the known sprue 12*, which gives rise to an enormous material saving. A disadvantage is however the tendency, associated with the asymmetry, toward a banana-shaped form of the molded part 1a after the shrinkage during the subsequent cooling, as illustrated by FIG. 5.

As a result of non-uniform shrinkage on the injection side and on the opposite side, a curvature of the real axis X'-X' of the molded part 1a in relation to the demanded, entirely rectilinear axis X-X of the molded part 1a, that is to say a distortion, may occur. Here, positive deviations $+\Delta X$ and negative deviations $-\Delta X$ may arise over the length of the axis. The greatest absolute value $\Delta X$ of all positive deviations $+\Delta X$ and negative deviations $-\Delta X$ is regarded as a measure for an attained straightness. A minimum is demanded for the value of the deviation from straightness.

Figure 5:
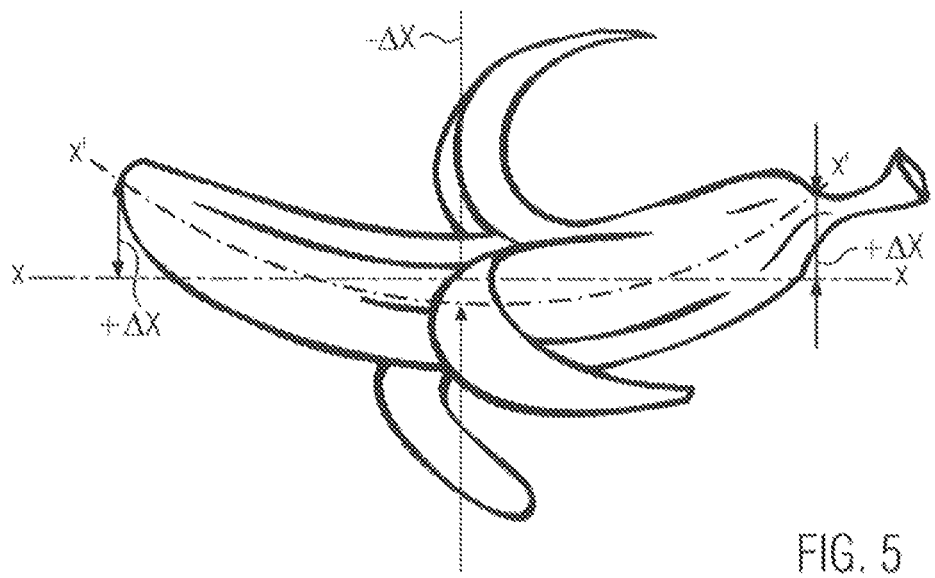
FIG. 5 is an illustration for showing a measure for the straightness of a plug-in connector according to the principles of the present invention.

Such a banana-shaped form, which is illustrated in an exaggerated manner in FIG. 5, would make the assembly of the plug part 1 more difficult if not entirely impossible. However, owing to the further features provided according to the invention, such a functionally disruptive form advantageously does not arise.

For the plug-in connector 1 according to the invention, this further feature consists in that, in the molded part 1a, in at least one of the main portions A1, A2, A3, there is a circumferentially radially asymmetrical mass distribution of the plastic, as can be seen from FIGS. 4b and 4d, but in particular also in its most pronounced form from FIG. 4f. It can thus be ensured that a plug-in connector 1 according to the invention does not have a greater axial deviation $\Delta X$ in the molded part 1a than is the case in a conventional plug-in connector 1*.

Figure 3B:
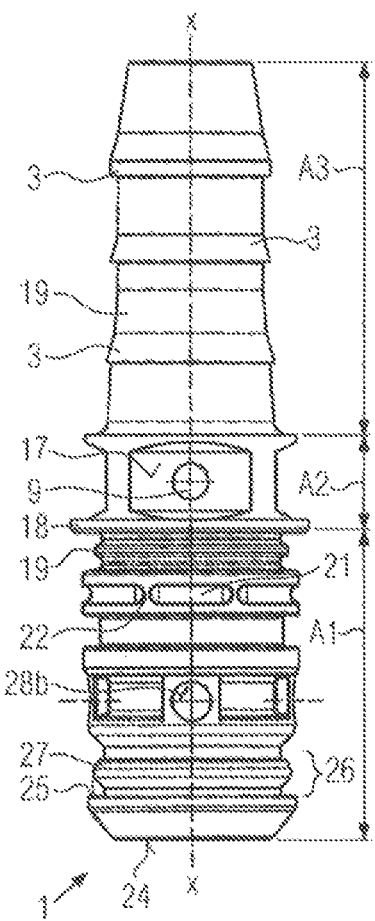

Even though, according to the invention, injection is basically possible in all main portions A1, A3, A3, the smallest deviations $\Delta X$ are however attained if the molded part 1a has its gate point 9 and/or the radially asymmetrical mass distribution of the plastic at least in the central portion A2, as shown by FIG. 2b and in particular FIGS. 3b and 4f.

A plug-in connector 1 according to the invention may thus preferably also have a radially asymmetrical mass distribution overall—that is to say as viewed over the entire length L of the molded part 1a. As illustrated, the center of mass may lie in particular on the side of the gate point 9. It would however also be possible for said center of mass to be situated on the side situated opposite the side of the gate point 9, or else offset through 90° in relation to the gate point 9.

Figure 6:
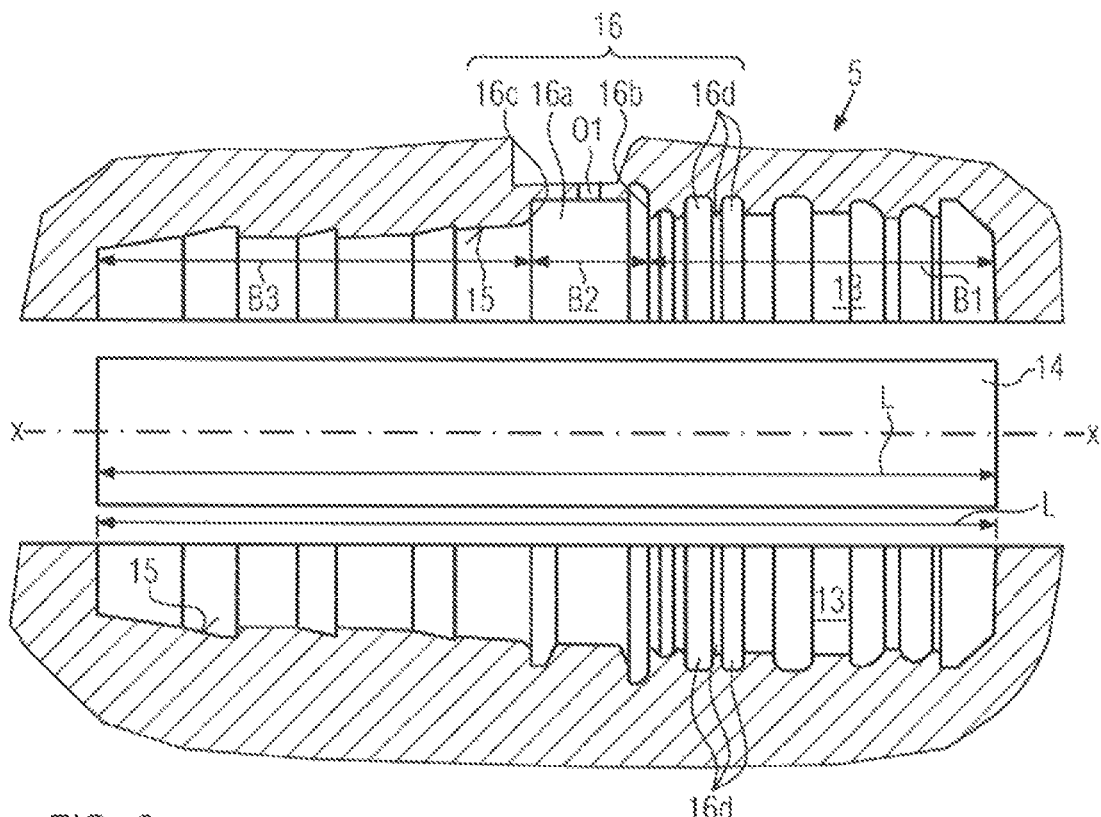
FIG. 6 shows, in longitudinal section, an opened molding tool which can be used in the method according to the principles of the present invention for producing a plug-in connector, including a core placed in said molding tool.

For this purpose, in a preferred embodiment, use may be made of a molding tool 5 as is shown schematically by way of example in FIG. 6, including a core 14 that can be placed therein for the purposes of forming the inner channel 2 of the plug-in connector 1.

The polymer compound M is injected into the tool 5 exclusively on one side, wherein, in at least one region B1, B2, B3 of the axial length L of the molding tool 5, a filling control element denoted generally by the reference designation 16 is arranged on the inner wall 15, which filling control element, during the filling of the cavity 13, inhibits the flow of the polymer compound M in an axial direction X-X and/or generates the radially asymmetrical distribution of the polymer compound M circumferentially around the core 14.

Since the cavity 13 illustrated in FIG. 6 is the negative form of the plug-in connector 1 according to the invention that emerges from FIGS. 2b, 3a and 3b, it also correspondingly has, over the axial length L of the cavity 13, three main portions B1, B2, B3 correspondingly to the three main portions A1, A2, A3, situated axially one behind the other, of the plug-in connector 1. These are a central region B2 and two end regions B1, B3 that directly adjoin the central region B2 at both sides. The polymer compound M is preferably injected into the central region B2 of the cavity 13 of the molding tool 5.

Multiple filling control elements 16 may be arranged over the axial length L of the inner wall 15 of the molding tool 5, such that regions which are exactly circular and regions with a shape which deviates from a regular circular shape alternate with one another in the cross section of the molding tool 5, whereby the cross-sectional shapes of the plug-in connector 1 which alternate with one another as per FIGS. 4a to 4g arise during the injection molding process. This shape alternation basically also emerges from FIG. 2b and from a comparison of FIG. 3a and FIG. 3b.

As can be seen from FIGS. 3b and 4f, the gate point 9 of the molded part 1a is situated on an elevated surface 17 in the central portion A2. The central portion A2, which in terms of basic shape is of square form unilaterally on said circumferential side, is in this case enlarged in terms of its volume by means of a unilateral asymmetrical recess of the inner wall 13 of the tool 5, which forms a first filling control element 16, in relation to the volume in the presence of a circular ring shape. The corners E of the square are—as shown in particular in FIG. 4f—preferably provided here with a bevel ES for better subsequent demoldability of the molding part 1a from the tool 5. The opposite region in the other half of the central portion A2 runs centrally or rotationally symmetrically with respect to the longitudinal axis X-X and is of circular ring-shaped form. By means of the specification of the corners E that are truncated by means of the bevel ES, the volume or mass ratio in the two halves of the asymmetrical cross section Q can be preset during the production of the molding tool 5, insofar as the volume-enlarging cross-sectional shape progressively approximates to a circular ring shape again with increasing size of the truncated corners E.

Said first filling control element 16 is referred to as first asymmetrical flow retarder 16a. Owing to the action of said flow retarder 16a and in particular also by virtue of the fact that a smaller mean wall thickness is generated opposite the gate point 9 than at the gate side, formation of an encircling form of the central portion A2 occurs quickly.

By means of the volume enlargement on the gate side, it is firstly advantageously possible for the effectiveness of a holding pressure applied after the ending of the filling of the cavity 13 not only to be basically ensured but even to be increased in relation to an embodiment with the conventional circular ring shape, which leads to reduced shrinkage during cooling of the molded part 1a.

Furthermore, the enlarged volume in the beveled corners E of the square together with a volume reduction in the cavity 13 by means of an annular groove 19 situated in the plug-in portion A1 behind an encircling flange 18 for an O-ring has the effect that, during the filling of the cavity 13, the flow of the polymer compound M in an axial direction X-X is inhibited. The section in FIG. 4e runs through said annular groove 19. During the injection molding process, the groove 19 is formed by an encircling rotationally symmetrically formed projection 16b in the inner wall 13 of the tool 5, which projection is thus to be regarded as a further filling control element 16. The polymer compound M, owing to the fact that it is prevented from flowing onward by the projection 16b, flows into the space situated in front in the flow direction in order to form the encircling flange 18, which has the greatest outer diameter of the molded part 1a as a whole.

In the same way as the annular groove 19, the formation of the diameter constriction 16c in the cavity also has an effect for forming the transition of the molded part 1a from the central region A2 to the attachment region A3 during the injection molding process. For this purpose, an encircling projection of rotationally symmetrical form is likewise provided in the inner wall 13 of the tool 5, which projection contributes to complete circumferential filling occurring quickly in the central region A2, and which projection is thus to be regarded as a third filling control element 16.

Remaining residual non-uniformities of the later distortion of the molded part 1a, which are caused by an excessively fast axial compound flow in relation to the circumferential flow speed of the polymer compound M, are readily acceptable on the barb profile, but in the plug-in portion A1, it is recommended that these also be eliminated. For this purpose, a further filling control element 16 is provided which is formed by a further asymmetrical contour, formed in the cavity 13 of the molding tool 5, of the inner wall 15, and which thus generates, circumferentially around the core 14, a radially asymmetrical distribution of the polymer compound M, wherein said further filling control element likewise retards the compound flow in an axial direction. Said fourth filling control element 16 is referred to as second asymmetrical flow retarder 16d. The second asymmetrical flow retarder 16d has the effect that, in the molded part 1a, a unilaterally enlarged additional volume 20 is implemented on the side of the gate 9, which additional volume serves as a compensating volume for an oppositely situated volume 21. Both volumes arise owing to a formation, which is of circular-ring-shaped basic shape and which extends over an axial length region in the plug-in portion A1, in the cross section Q, wherein the ring width $s_1$ of the enlarged additional volume 20 is greater than the ring width $s_2$ of the oppositely situated volume 21. In order that the half-rings fit together closely at the location of their convergence, their respective outer radii are slightly deformed. This geometrical asymmetry leads to a uniform axial frontal flow of the compound M.

In order to prevent a collapse of the compound M in the region of the second asymmetrical flow retarder 16d during the later cooling, which takes place with shrinkage, of the molded part 1a, the molded part 1a comprises stabilizing ribs 22 on the side of the smaller volume. Said stabilizing ribs project, over the axial length of the mass asymmetry 20/21, in a secant-like manner from the outer circumference of the half-ring with the smaller width $s_2$. Furthermore, the half-ring with the greater ring width $s_1$ has a notch 23 which has a dimensionally stabilizing action, which runs circumferentially and which is of V-shaped form in the plan view illustrated in FIG. 3a.

In order to attain the greatest possible straightness of the real longitudinal axis X'-X' of the molded part 1a, which is also expressed in the fact that the face surface 24 of the plug-in connector 1 according to the invention in the plug-in portion A1, and in particular also a detent surface 25, situated there in the tip region, of a detent groove 26 for a detent element (not illustrated), in particular a double detent element, is at right angles to the demanded axis form X-X, it is preferably possible, in accordance with the method, for a final optimization to be performed by means of the volume of the molded part 1. FIG. 4a illustrates a section through the detent groove 26, which, centrally, correspondingly to the special form known from WO 2010/006838 A1, has a circumferential bead 27 which prevents tilting of the plug part 1 during plugging-in. The section—denoted in FIG. 3a by A-A—runs through the groove situated above said bead 27 in FIG. 3a.

The orientation of the detent surface 25 at right angles to the plug-in axis, which is identical to the longitudinal axis X-X of the plug part 1, ensures, during subsequent assembly, that the plugging-in of the plug part 1 into a receiving opening of a housing part takes place unhindered. Owing to the right-angled form of the detent groove 26, it is also the case, after the assembly process, that the holding forces are introduced more uniformly, and a greater holding force or greater bursting pressure stability can be achieved.

For the fine setting of the straightness of the axis X-X, use is made here of the fact that, for a plug part 1, it may be conventional for this to be equipped with production date labels on the outer circumference. For this purpose, an embossing pin proceeding from the inner wall 15 protrudes radially into the cavity 13, whereby an annular flattening is formed on the circumference of the molded part 1a, on which flattening the corresponding date can be seen. From a pair of two embossing pins situated circumferentially diametrically opposite one another, which generate flattenings 28a, 28b with in each case different, settable depth $t_1$, $t_2$, and thus an asymmetry, a fifth filling control element 16 is thus preferably formed as third asymmetrical flow retarder 16e. The embossing pins are not illustrated in FIG. 6, which shows the tool 5. In FIG. 4b, which shows the pair of flattenings 28a, 28b with their respectively different depth $t_1$, $t_2$, these are however denoted by the designation "by 16e", which indicates the generation thereof by the fifth filling control element 16.

The figure sequence FIG. 7a to FIG. 7d shows, in a schematic illustration, the filling of the cavity 13 of the molding tool 5, wherein, for the purposes of visualizing the flow characteristic of the polymer compound M, various phases of the method according to the invention for producing the plug-in connector 1 according to the invention have been arbitrarily picked out from the overall sequence. In the figure sequence, for the purposes of improved clarity, not all of the parts have been denoted using the reference designations from the other figures; this applies in particular to the filling control elements 16. For this purpose, reference is made to FIG. 2b, FIG. 3a, FIG. 3b, FIGS. 4a to 4g and FIG. 6.

FIG. 7a firstly shows a state immediately after the entry of the compound M into the cavity 13. The polymer compound begins to fill the cavity 13 by flowing, at the gate point 9, out of the injection opening O1 in all of the directions indicated in the drawing by the arrows, in particular simultaneously to both sides at equal speed in an axial direction X-X of the molded part 1a being formed and to both sides at equal speed in a circumferential direction around the core 14. The filling control elements 16 (not illustrated) advantageously have the effect, during the filling of the cavity 13, that the flow of the polymer compound in an axial direction X-X is inhibited and/or that a radially asymmetrical distribution of the polymer compound M arises circumferentially around the core 14. Consequently, during the filling of the cavity 13, the polymer compound M propagates at a higher speed in a circumferential direction (arrow U in FIG. 7b) than in an axial direction X-X. As a result, during the subsequent cooling, a shrinkage behavior of the molded part is realized by means of which an axis distortion $\pm\Delta X$ is, in extremal terms, minimized.

FIG. 7b shows a state after the compound M has circumferentially converged, forming a binding seam BN, in the cavity 13 on the side situated opposite the gate side. As a result of the retarding of the compound propagation in an axial direction X-X, a minimization of the axial length of the binding seam BN is advantageously realized. Proceeding from the central region B2 of the cavity 13 of the molding tool 5, it is the case here that the two end regions B1, B3 directly adjoining the central region B2 on both sides are not yet completely filled with the compound. The end region B1 intended for the formation of the plug-in region A1 is somewhat more than half filled, and the end region B3 intended for the formation of the attachment region A3 is somewhat less than half filled.

FIG. 7c shows a state in which the compound M, after converging circumferentially, moves only in an axial direction X-X. This flow behavior is referred to as extrusion and is substantially equivalent to that which occurs during the production of a pipe wherein a compound is injected in an axial direction into a mold. This flow characteristic is highly advantageous with regard to subsequent distortion-free shrinkage of the molded part 1a. Depending on the length ratios of the portions A1, A2, A3 and B1, B2, B3 with respect to one another, it can advantageously be achieved by means of the filling control elements 16 that, of a volume of the cavity 13 which is defined by a length between the injection opening O1 of the polymer compound M and an end, which delimits the axial extent of the cavity 13, of the inner wall 15 of the molding tool 5, at least 20 percent, preferably at least 40 percent, particularly preferably at least 60 percent is filled exclusively by means of extrusion of the polymer compound M through the space that is formed between the inner wall 15 of the molding tool 5 and the core 14 arranged therein.

FIG. 7d shows a state shortly before the ending of the injection of the polymer compound M. The plug-in portion of the molded part has already been fully formed, whilst the compound M fills a final portion of the barbed part by extrusion.

By means of at least one filling control element 16, in particular one or more filling control elements 16 in one of the various embodiments 16a, 16b, 16c, 16d, 16e described as being preferred, it can be achieved according to the invention that all of the material for sprues 12* that are present in the known situation is saved, and that a greater number of plug-in connectors 1 can be produced in a particular time in relation to the prior art, wherein the axial straightness of the molded part 1a required in particular for quick-action connectors is adhered to.

The invention is not restricted to the exemplary embodiment illustrated and described, but rather also encompasses all embodiments of identical action in the context of the invention. It is expressly pointed out that the exemplary embodiment is not restricted to all of the features in combination; rather, each individual sub-feature may also be of inventive significance independently of all other sub-features. Accordingly, a plug-in connector 1 according to the invention may also be used in plug-in systems, other than the application mentioned in the introduction, in which it is of importance for the plug part 1 to have a certain straightness at least in sub-regions. The circumferential contour, extending over the axial length L, of the plug-in connector 1 according to the invention could accordingly, depending on the respectively present plug-in system, be subject to modifications within the scope of protection of the claims without departing from the scope of the invention.

Instead of the positive deviations $+\Delta X$ and negative deviations $-\Delta X$ over the axis length as discussed with reference to FIG. 5, from which the greatest absolute value $\Delta X$ is then determined, it is also possible for percentage deviations $\Delta X/L*100\%$ in relation to the length L of the molded part 1a to be stated. Here, according to the invention, it is possible to achieve values of less than 7%, in particular less than 2%, preferably less than 1%, particularly preferably less than 0.5%.

Furthermore, the invention is hitherto also not restricted to the combinations of features defined in the independent claims, but rather may also be defined by any desired other combination of particular features of all of the individual features disclosed overall. This means that basically practically any individual feature of the independent claims may be omitted or replaced by at least one individual feature disclosed elsewhere in the application.

The invention claimed is:

1. A method for producing a plug-in connector, wherein the plug-in connector is produced as a molded part by injection molding of a polymer compound under pressure into a cavity formed by an inner wall of a molding tool and a core arranged in the cavity to form an inner channel of the plug-in connector, the method comprising the steps of:
   injecting the polymer compound exclusively at one side through a single injection opening in a region of an axial length of the molding tool,
   inhibiting the flow of the polymer compound in an axial direction and generating a radially asymmetrical distribution of the polymer compound circumferentially around the core by providing a filling control element on the inner wall of the molding tool,
   flowing the polymer compound in a circumferential and axial direction around the core until the cavity is completely filled,
   cooling the polymer compound until solidified, and
   demolding the molded part from the molding tool.

2. The method as claimed in claim 1, wherein the polymer compound is injected into a central region along the axial length of the cavity of the molding tool.

3. The method as claimed in claim 1, including providing multiple filling control elements arranged over the axial length of the inner wall of the molding tool, whereby regions which are exactly circular in cross section and regions with a shape deviating from a regular circular shape alternate with one another over the axial length of the inner wall of the molding tool.

4. The method as claimed in claim 1, further comprises the step of propagating the polymer compound at a higher speed in a circumferential direction than in an axial direction during the filling of the cavity.

5. The method as claimed in claim 1, wherein the filling control element is arranged in at least one of a central region of the cavity of the molding tool and one of two end regions that directly adjoin the central region on both sides of the cavity of the molding tool.

6. The method as claimed in claim 1, wherein the filling control element is formed by at least one projection or recess in the inner wall of the tool and the projection or recess is at least one of encircling or unilateral and at least one of symmetrical or asymmetrical.

7. The method as claimed in claim 1, wherein at least twenty percent of a volume of the cavity defined by a length between the injection opening and an end delimiting the axial extent of the cavity of the inner wall of the molding tool is filled exclusively by means of extrusion of the polymer compound through a space formed between the inner wall of the molding tool and the core arranged therein.

8. The method as claimed in claim 1, wherein a needle closure nozzle is used for the injection of the polymer compound.

9. The method as claimed in claim 1, wherein at least forty percent of a volume of the cavity defined by a length between the injection opening and an end delimiting the axial extent of the cavity of the inner wall of the molding tool is filled exclusively by means of extrusion of the polymer compound through a space formed between the inner wall of the molding tool and the core arranged therein.

10. The method as claimed in claim 1, wherein at least sixty percent of a volume of the cavity defined by a length between the injection opening and an end delimiting the axial extent of the cavity of the inner wall of the molding tool is filled exclusively by means of extrusion of the polymer compound through a space formed between the inner wall of the molding tool and the core arranged therein.

11. A method for producing a plug-in connector, wherein the plug-in connector is produced as a molded part by injection molding of a polymer compound under pressure into a cavity formed by an inner wall of a molding tool and a core arranged in the cavity to form an inner channel of the plug-in connector, the method comprising the steps of:
   injecting the polymer compound exclusively at one side through a single injection opening in a region of an axial length of the molding tool,
   inhibiting the flow of the polymer compound in an axial direction and/or generating a radially asymmetrical distribution of the polymer compound circumferentially around the core by providing a filling control element on the inner wall of the molding tool, the filling control element being formed by at least one pair of flattenings which are situated circumferentially diametrically opposite one another and which are of different depths,
   flowing the polymer compound in a circumferential and axial direction around the core until the cavity is completely filled,
   cooling the polymer compound until solidified, and
   demolding the molded part from the molding tool.

* * * * *